(12) United States Patent
Weingarten

(10) Patent No.: US 9,803,755 B2
(45) Date of Patent: Oct. 31, 2017

(54) DELUGE VALVE WITH VALVE SEAT DRAIN

(71) Applicant: BERMAD CS LTD., Kibbutz Evron (IL)

(72) Inventor: Zvi Weingarten, Kibbutz Evron (IL)

(73) Assignee: BERMAD CS LTD., Kibbutz Evron (IL)

( * ) Notice: Subject to any disclaimer, the term of this patent is extended or adjusted under 35 U.S.C. 154(b) by 0 days.

(21) Appl. No.: 14/896,924

(22) PCT Filed: Nov. 16, 2015

(86) PCT No.: PCT/IL2015/051101
§ 371 (c)(1),
(2) Date: Dec. 9, 2015

(87) PCT Pub. No.: WO2016/075698
PCT Pub. Date: May 19, 2016

(65) Prior Publication Data
US 2017/0037975 A1 Feb. 9, 2017

Related U.S. Application Data

(60) Provisional application No. 62/080,359, filed on Nov. 16, 2014.

(51) Int. Cl.
*F16K 1/40* (2006.01)
*F16K 7/17* (2006.01)
(Continued)

(52) U.S. Cl.
CPC ............ *F16K 1/443* (2013.01); *F16K 7/17* (2013.01); *A62C 35/68* (2013.01); *F16K 1/446* (2013.01)

(58) Field of Classification Search
CPC ....... A62C 35/68; A62C 35/62; A62C 35/645; F16K 1/443; F16K 1/446; F16K 7/17
(Continued)

(56) References Cited

U.S. PATENT DOCUMENTS 929,710 A * 8/1909 Rockwood ........... A62C 35/645
169/22
1,076,302 A * 10/1913 McElroy ................. D06F 9/081
137/312

(Continued)

*Primary Examiner* — Michael R Reid
*Assistant Examiner* — Jonathan Waddy
(74) *Attorney, Agent, or Firm* — Mark M. Friedman

(57) ABSTRACT

A valve (10) for sealing and selectively opening a flow path from a water-filled inlet (210) to a dry outlet (220) includes a valve body (100) having a valve opening (230) surrounded by first and second annular valve seat regions (110, 120). A drainage channel (510, 512)) connects to a space between the first and second annular valve seat regions (110, 120). A plug (300) is displaceable between an open state and a closed state for closing the valve opening (230). The plug has a first annular seal (310) for sealing against first annular valve seat region (110) and a second annular seal (350) for sealing against the second annular valve seat region (120). The second annular seal (350) is a flexible seal deployed so that it closes prior to closure of the first annular seal (310). Second annular seal (350) is elastically deformed so as to be pressed into contact with the second annular valve seat (120) when the plug (300) reaches its closed state.

5 Claims, 8 Drawing Sheets

(51) Int. Cl.
*A62C 35/68* (2006.01)
*F16K 1/44* (2006.01)

(58) Field of Classification Search
USPC ...... 251/175, 190, 191, 61.1; 169/19, 20, 22
See application file for complete search history.

(56) References Cited

U.S. PATENT DOCUMENTS

| | | | | |
|---|---|---|---|---|
| 1,196,874 A * | 9/1916 | Loepsinger | ........... | A62C 35/645 137/513 |
| 1,197,282 A * | 9/1916 | Garrett | ................. | A62C 35/645 169/22 |
| 1,241,209 A * | 9/1917 | Grinnell | ............... | A62C 35/645 169/20 |
| 1,291,411 A * | 1/1919 | Clark | ................... | A62C 35/645 169/22 |
| 1,299,065 A * | 4/1919 | Townsend | ............ | A62C 35/645 169/22 |
| 1,311,388 A * | 7/1919 | Gross | ................... | A62C 35/645 169/22 |
| RE14,746 E * | 10/1919 | Rockwood | ....................... | 169/22 |
| 1,428,700 A * | 9/1922 | Meadowcroft | ....... | A62C 35/645 169/22 |
| 1,553,884 A * | 9/1925 | Tyden | .................. | A62C 35/645 169/22 |
| 1,608,074 A * | 11/1926 | Tyden | .................. | A62C 35/645 169/17 |
| 1,630,783 A * | 5/1927 | Clark | ................... | A62C 35/645 169/22 |
| 1,662,839 A * | 3/1928 | Tyden | .................. | A62C 35/645 137/513 |
| 1,726,274 A * | 8/1929 | Meloon | ................ | A62C 35/645 169/22 |
| 1,790,467 A * | 1/1931 | Griffith | ................ | A62C 35/645 169/22 |
| 2,024,555 A * | 12/1935 | Wallace | ................ | A62C 35/645 169/22 |
| 2,124,995 A * | 7/1938 | Hodgman, Jr. | ........ | F16K 1/2028 169/22 |
| 2,586,720 A * | 2/1952 | Rowley | ................ | A62C 35/605 137/154 |
| 3,055,629 A * | 9/1962 | Jurs | .......................... | F16K 24/04 251/175 |
| 3,589,445 A * | 6/1971 | Juliano | .................. | A62C 35/66 169/17 |
| 5,236,049 A * | 8/1993 | Asselin | .................. | A62C 37/44 169/17 |
| 5,927,406 A * | 7/1999 | Kadoche | ................ | A62C 35/62 169/17 |
| 7,673,695 B2 | 3/2010 | Deurloo | | |
| 8,051,915 B2 * | 11/2011 | Blease | .................. | A62C 35/68 169/16 |
| 2005/0023496 A1 * | 2/2005 | Foster | ....................... | F16K 1/46 251/191 |
| 2006/0016494 A1 * | 1/2006 | Irwin | ........................ | F16K 7/17 137/625.28 |

\* cited by examiner

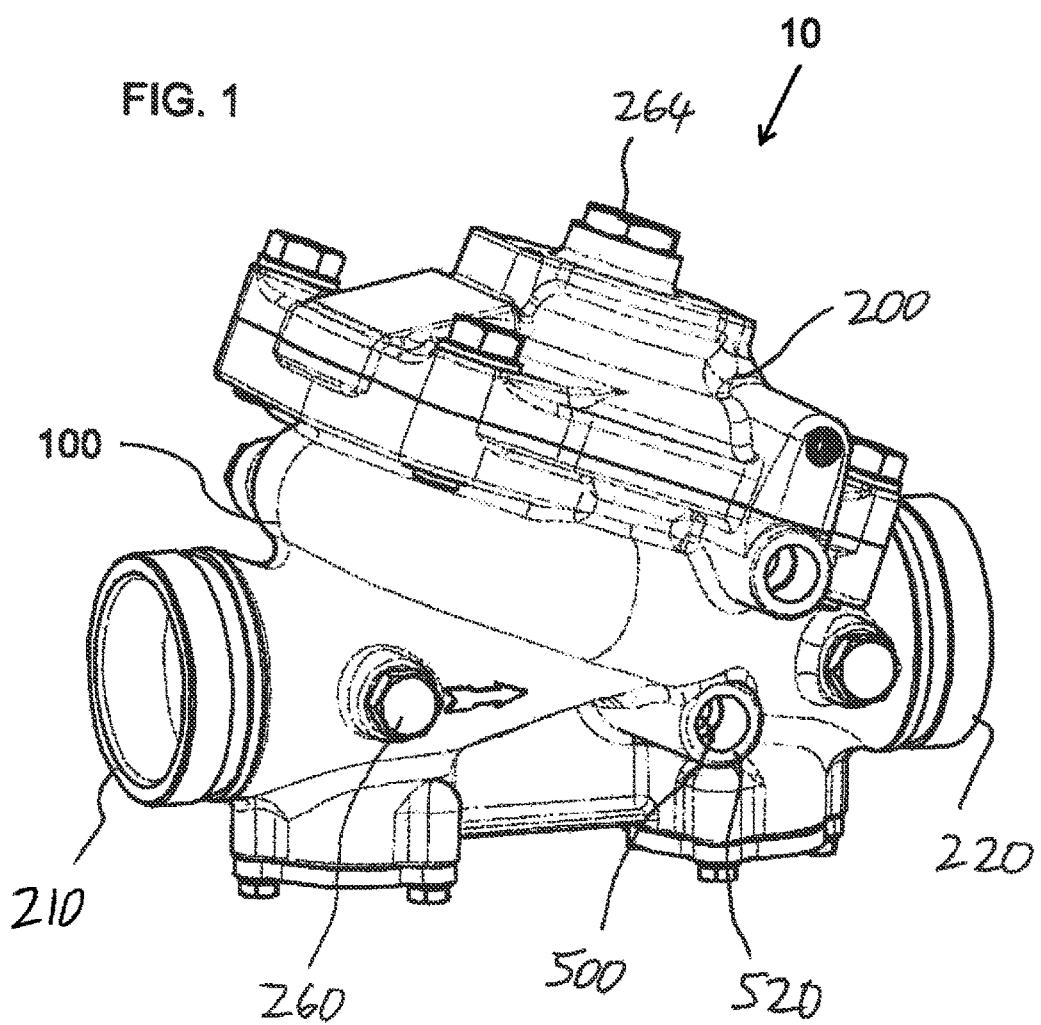

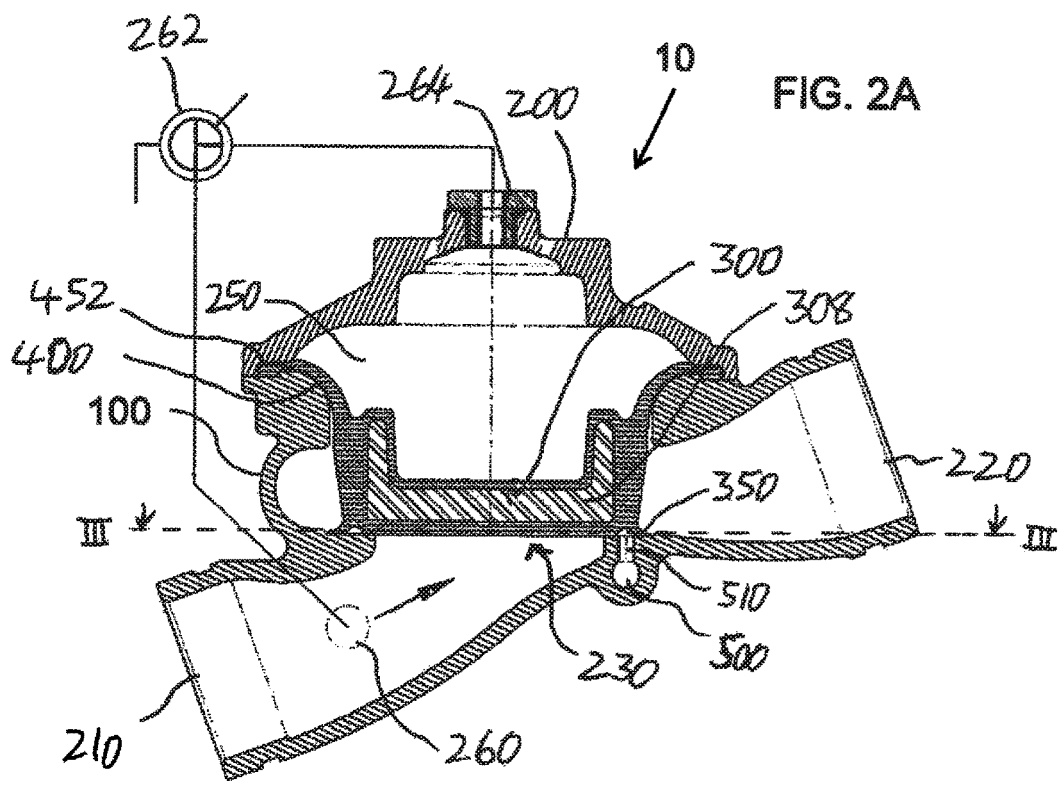
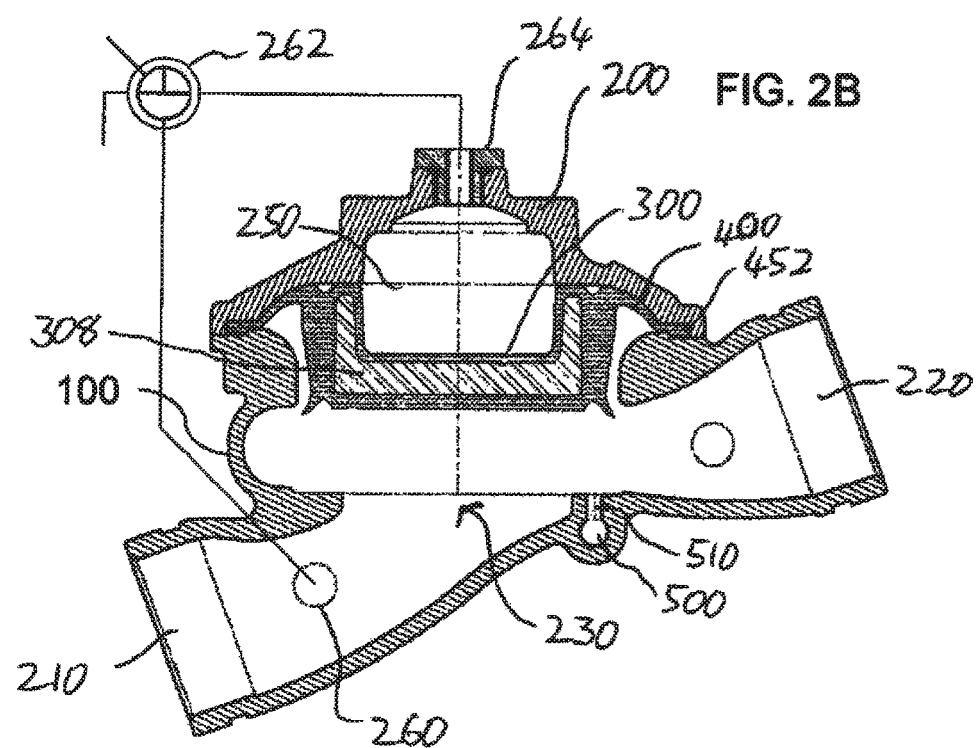

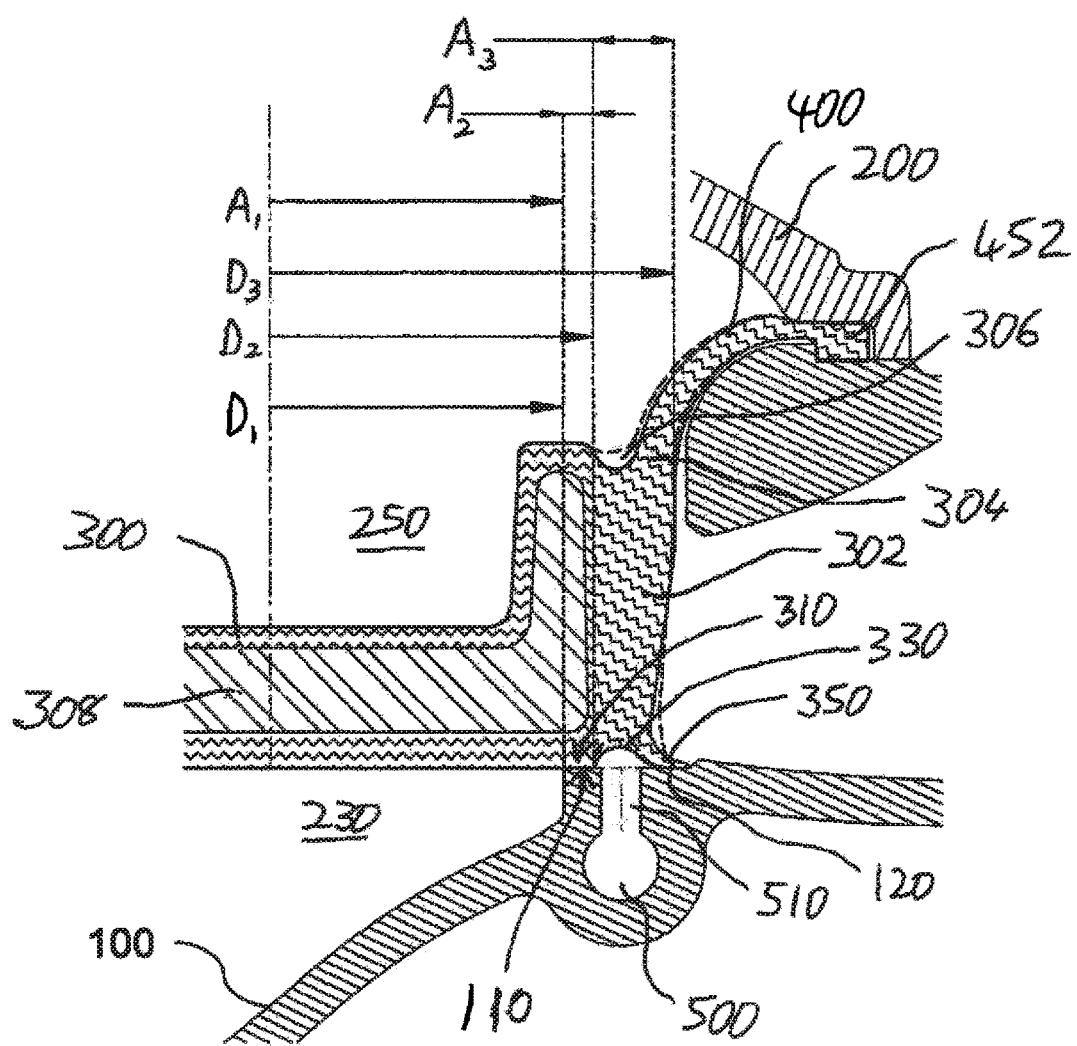

FIG. 6
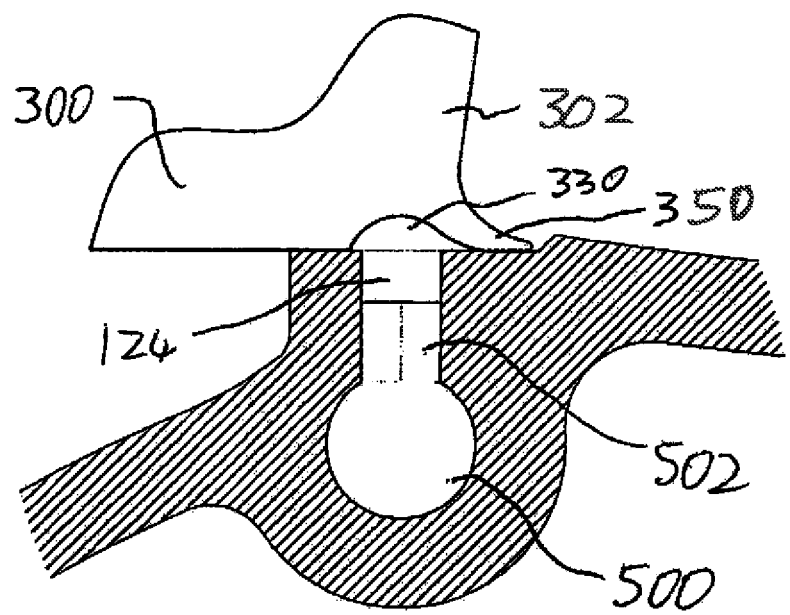
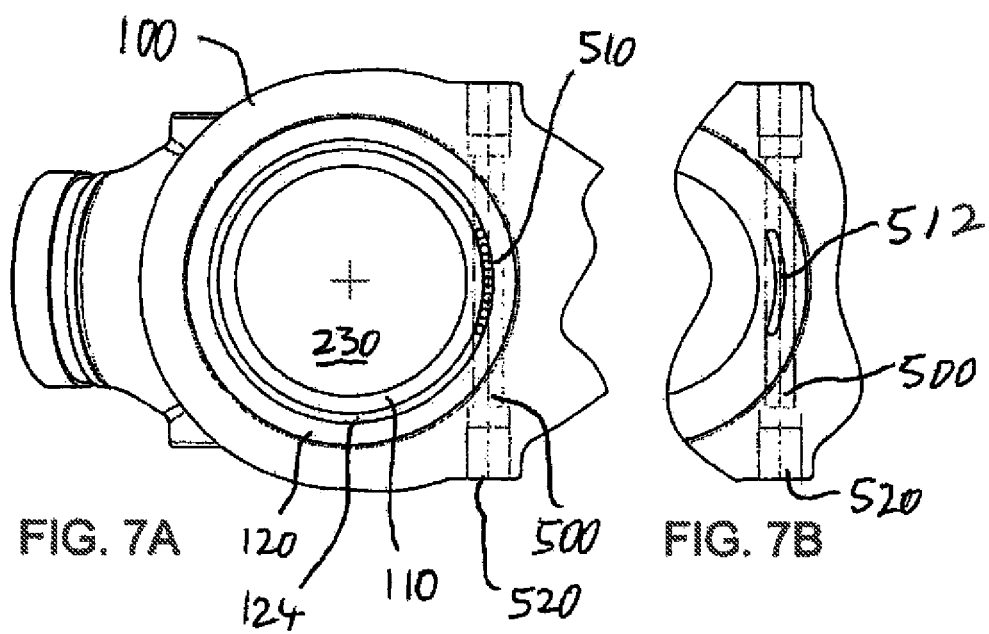
FIG. 7A    FIG. 7B

DELUGE VALVE WITH VALVE SEAT DRAIN

FIELD AND BACKGROUND OF THE INVENTION

The present invention relates to valves and, in particular, it concerns a deluge valve with a valve seat drain.

It is known to provide a valve, often referred to as a "deluge valve", for sealing and selectively opening a flow path from a water-filled inlet to a dry outlet for applications such as a sprinkler-based fire suppression system. The deluge valve is a normally-closed valve which prevents passage of water until the sprinkler system is to be activated.

In many systems, the deluge valve forms a barrier between an upstream water-filled pipe and a dry downstream pipe system leading to the sprinklers. Such implementations have particular advantages where the sprinkler system may be exposed to low temperatures such that water-filled pipes would be at risk of blockage from freezing. Where the downstream pipes are to be kept dry, it is considered unacceptable for the deluge valve to release even small quantities of water to the outlet pipes, and there is a consequent problem of reliability of such deluge valves when slight leaks occur, requiring inconvenient and expensive maintenance.

SUMMARY OF THE INVENTION

The present invention is a valve for sealing and selectively opening a flow path from a water-filled inlet to a dry outlet.

According to the teachings of the present invention there is provided, a valve for sealing and selectively opening a flow path from a water-filled inlet to a dry outlet, the valve comprising: (a) a valve body having a valve opening surrounded by a first annular valve seat region, and having a second annular valve seat region surrounding the first annular valve seat region, the valve body including at least one drainage channel in fluid connection with a space between the first and second annular valve seat regions, the drainage channel providing a fluid drainage path to outside the valve body; and (b) a plug displaceable between an open state and a closed state for closing the valve opening, the plug having a first annular seal deployed for sealing against the first annular valve seat region and a second annular seal deployed for sealing against the second annular valve seat region, wherein the second annular seal is a flexible seal deployed such that, during displacement of the plug from the open state towards the closed state, the second annular seal closes against the second annular valve seat region prior to contact between the first annular seal and the first annular valve seat region, the second annular seal being elastically deformed so as to be pressed into contact with the second annular valve seat when the plug reaches the closed state.

According to a further feature of an embodiment of the present invention, the second annular seal has an outward flaring lip deployed such that a pressure differential between an outlet pressure at the outlet and a drain pressure in the drainage channel acts to enhance a seal for the second annular seal against the second annular valve seat region.

According to a further feature of an embodiment of the present invention, the plug is associated with a flexible diaphragm, the valve further comprising a cover cooperating with the diaphragm to define a control chamber between the diaphragm and the cover.

According to a further feature of an embodiment of the present invention, the plug, the diaphragm, the valve body and the cover are configured such that, when a pressure in the control chamber equals a pressure at the inlet, a net closing force acts to close the first annular seal against the first annular valve-seat region.

According to a further feature of an embodiment of the present invention, the plug and the diaphragm are configured such that a closing force of the second annular seal against the second annular valve seat portion varies as a function of at least a pressure difference between the control chamber and the drainage channel.

BRIEF DESCRIPTION OF THE DRAWINGS

The invention is herein described, by way of example only, with reference to the accompanying drawings, wherein:

FIG. 1 is an isometric view of an automatic hydraulic deluge valve in accordance with an embodiment of the present invention;

FIGS. 2A and 2B are cross sectional views taken through the automatic hydraulic deluge valve of FIG. 1, showing a plug in a closed state and an open state, respectively;

FIG. 4B is an enlarged view of a region of FIG. 4A;

FIG. 6 is a cross-sectional view similar to FIG. 5A, showing an alternative configuration of the valve seat;

FIG. 7A is a top view of a valve body similar to FIG. 3 according to the alternative valve seat configuration of FIG. 6;

FIG. 7B is a partial view similar to FIG. 3 illustrating an alternative form of a drainage opening of the valve body.

DESCRIPTION OF THE PREFERRED EMBODIMENTS

Figure 3:
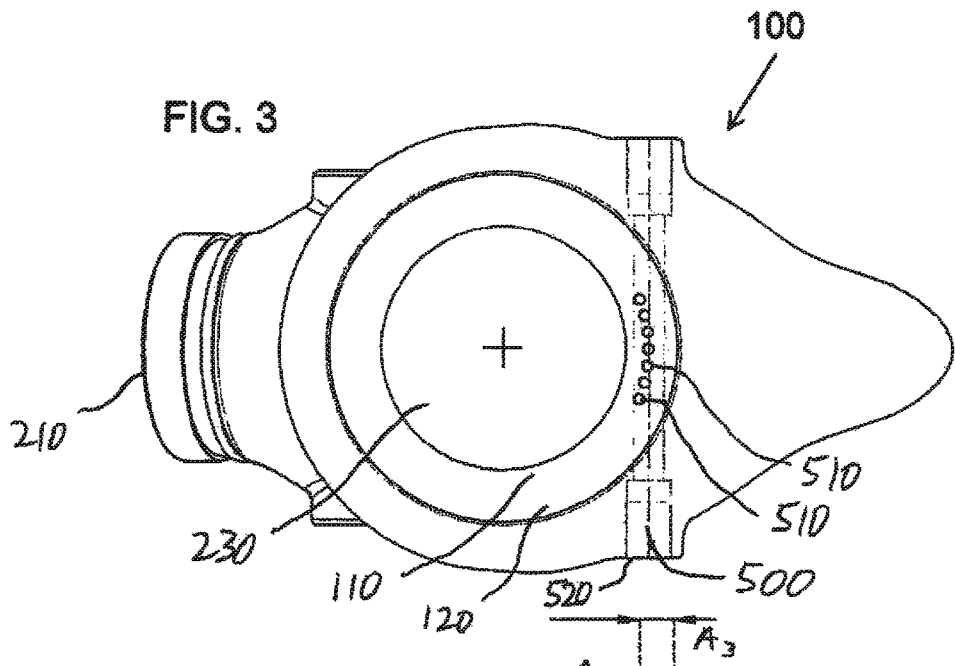
FIG. 3 is a top view of a valve body from the valve of FIG. 1 cut away along a line III-III shown in FIG. 2A.

The present invention is a valve for sealing and selectively opening a flow path from a water-filled inlet to a dry outlet.

The principles and operation of valves according to the present invention may be better understood with reference to the drawings and the accompanying description.

Referring now to the drawings, FIGS. 1-8 illustrate a valve, generally designated 10, constructed and operative according to an embodiment of the present invention, for sealing and selectively opening a flow path from a water-filled inlet (upstream port) 210 to a dry outlet (downstream port) 220. In general terms, valve 10 has a valve body 100 having a valve opening (valve seat bore) 230 surrounded by a first annular valve seat region 110, and having a second annular valve seat region 120 surrounding first annular valve seat region 110. Valve body 100 includes at least one drainage channel, illustrated here as drainage openings 510, in fluid connection with a space between first and second annular valve seat regions 110, 120. The drainage channel provides a fluid drainage path, typically via a drainage conduit 500, to outside valve body 100. A plug 300 is displaceable between an open state (FIG. 2B) and a closed state (FIG. 2A) for closing valve opening 230. Plug 300 has a first annular seal 310 deployed for sealing against first annular valve seat region 110 and a second annular seal 350 deployed for sealing against second annular valve seat region 120. Second annular seal 350 is implemented as a flexible seal deployed such that, during displacement of the plug from the open state towards the closed state, second annular seal 350 closes against second annular valve seat region 120 prior to contact between first annular seal 310 and first annular valve seat region 110. Second annular seal 350 is elastically deformed so as to be pressed into contact with second annular valve seat 120 when plug 300 reaches the closed state, with first annular seal 310 sealing against first annular valve seat region 110.

The above arrangement in which an outer seal closes before completion of the closing motion of plug 300, and in which drainage is provided from the space between the two seals, provides greatly enhanced protection against unwanted leakage of water from inlet 210 to outlet 220. Specifically, if plug 300 is momentarily slightly lifted by a spike in inlet pressure, the opening motion is typically not sufficient to affect the second seal, and any water which is trapped between the seals when the plug returns to its normal sealing position drains via drainage openings 510 without reaching the downstream pipes. Similarly, any dirt or debris which might become trapped in the first seal and cause a slow leak only results in penetration of water to the space between the seals from which it drains via drainage openings 510 without reaching the downstream pipes. These and other advantages of the present invention will further understood with reference to the following drawings and description.

As a primarily example of the applications to which the present invention applies, reference will be made throughout this document to water as the pressurized fluid, and to sprinkler systems as a downstream destination for the water. It should be appreciated however that the invention is not per se limited to such an application, and it may find utility in a range of other applications in which a valve defines the boundary between a liquid-filled length of pipe and a dry length of pipe.

Turning now to the features of certain preferred embodiments of the invention in more detail, second annular seal 350 may advantageously be implemented as an outward flaring lip (also referred to as a "check lip") deployed such that a pressure differential between an outlet pressure at outlet 220 and a drain pressure in the drainage channel 500 acts to enhance a seal of second annular seal 350 against second annular valve seat region 120. The word "flared" here refers to a structure which extends outwards as it extends downwards, corresponding to the fact that the lip of seal 350 extends outwards and downwards from the plug. In the primary embodiment illustrated herein, this lip in its relaxed state extends downwards below the level of first annular seal 310, thereby ensuring that seal 350 contacts second annular valve seat region 120 before closure of first annular seal 310 when both valve seat regions are in a common plane. In other cases where the valve seat is stepped or otherwise contoured, the desired sequence of closure may be achieved even where seal 350 is on the same level, or in some cases higher, than first annular seal 310.

The use of a flared lip as at least part of seal 350 may serve various purposes. Firstly, the lip is preferably formed from elastomeric material and contributes to the flexibility of seal 350 allowing the seal to close before the plug has reached its closes end position, and then absorbs the rest of the motion by undergoing elastic deformation. The flexibility of the lip is preferably enhanced by providing an annular recess 330 in the lower surface of the plug, at the root of the lip. This annular recess also contributes to forming a continuous channel around the periphery of the first annular seal 310 which allows passage of any water between the seals so that it can reach drainage opening 510.

A further preferred function of the lip is to utilize a back-pressure in the outlet pipeline to enhance sealing of the valve. Dry air-filled pipes of sprinkler systems are typically maintained at a slightly elevated air pressure so that opening of a sprinkler head in the system can be sensed by the drop in air pressure. This air pressure acts on the upper side of the lip, while the lower side of the lip is exposed to atmospheric pressure via drainage conduit 500 and openings 510. This pressure differential generates further enhanced contact force of the lip against second annular valve seat region 120, thereby further enhancing the seal.

Certain particularly preferred implementations of the present invention as illustrated here are hydraulically controlled valves in which closure of the valve is achieved and maintained by pressure within a control chamber. In the preferred implementation illustrated herein, plug 300 is associated with a flexible diaphragm 400. Diaphragm 400 may be attached to plug 300 or, as shown here, may be integrated with the plug, where a major part of plug 300 is formed from elastomeric material. Where formed from elastomer, the dimensions of the main body of plug 300 are preferably chosen to render it relatively non-flexible, so as to reliably perform its sealing function across valve seat bore 230. Additionally, or alternatively, added rigidity may optionally be imparted to the main body of plug 300 by inclusion of a rigid core 308 (metallic, ceramic or other) within the elastomer body. The outer periphery of diaphragm 400 is preferably anchored between valve body 100 and cover 200, for example, by a peripheral thickened bead 452 which engages and seals against a corresponding channel formed between the cover and the valve body.

Valve 10 also includes a cover 200 which cooperates with diaphragm 400 to define a control chamber 250 between diaphragm 400 and cover 200. Most preferably, plug 300, diaphragm 400, valve body 100 and cover 200 are configured such that, when a pressure in the control chamber equals a pressure at the inlet, a net closing force acts to close the first annular seal against the first annular valve-seat region. The balance of surface areas on which the inlet pressure acts to achieve this result is discussed further below. This allows a particularly simple control arrangement as illustrated schematically in FIGS. 2A and 2B. In the normal closed state of valve 10 shown in FIG. 2A, pressure from a pressure feed 260 is passed via a pilot valve 262 to a control chamber port 264. In this state, equal pressures in inlet 210 and control chamber 250 act on diaphragm which, as detailed below, applies a net closing force on plug 300. When pilot valve 262 is switched to the state of FIG. 2B, the pressure within control chamber 250 is cut off from pressure feed 260 and is opened to a drain at atmospheric pressure, allowing the inlet pressure to act on the lower surface of plug 300 and displace it towards the open position of FIG. 2B.

A further particularly preferred feature of certain embodiments of the present invention is that a closing force of second annular seal 350 against second annular valve seat portion 120 varies as a function of at least a pressure difference between control chamber 250 and drainage openings 510. Specifically, in the particularly preferred but non-limiting implementation of FIGS. 2A-4B, there is continuous peripheral section 302 of elastomeric material extending around plug 300 to as to form a continuous bridge between an upper peripheral portion 304 of plug 300 at the root of diaphragm 400 and second annular seal 350. Peripheral section 302 undergoes a shear deformation according to a pressure difference between upper peripheral portion 304 and the pressure within annular channel 330 (atmospheric pressure), resulting in an enhanced contact pressure and conforming of seal 350 to second annular valve seat portion 120. Optionally, an upper annular recess 306 extending around plug 300 just inward of the root of diaphragm 400 helps to reduce resistance of peripheral section 302 to shear deformation, thereby enhancing the function of seal 350 as an independent seal. In certain implementations (not shown), annular recesses 330 and 306 may be implemented as deeper recesses from opposing top/bottom sides of plug 300 so as to further increase axial mobility of peripheral section 302 relative to the main part of plug 300.

Drainage openings 510 and drain e conduit 500 serve to drain any small quantity of water which may penetrate the seal of first valve seat 110 to reach the atmospheric pressure-zone between the two seals so that it is released via a drainage port 520. The seal of second valve seat 120 prevents ingress of water to the dry pipes of the sprinkler system, and prevents backflow of the compressed air to the drainage openings. Optionally, drainage port 520 may be connected to an alarm system (not shown) so that, on opening of valve 10, a flow of water exiting through drainage openings 510 is effective to actuate an alarm.

Figure 4A:
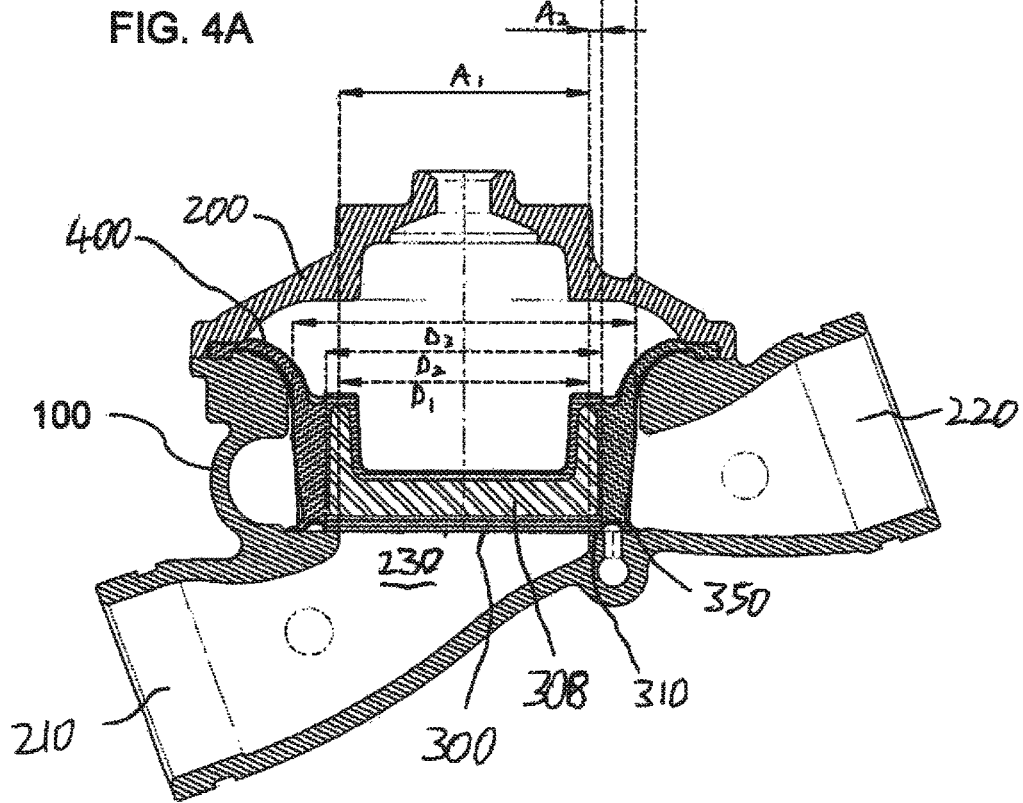
FIG. 4A is a cross-sectional view similar to FIG. 2 labeling various regions of a plug-and-diaphragm assembly of the valve upon which a pressure within a control chamber acts.

FIGS. 4A and 4B show the different areas of plug 300 and diaphragm 400 on which forces are applied by the liquid pressure within the valve. In the normally-closed state of FIG. 2A, as described above, the pressure within control chamber 250 is maintained equal to the inlet pressure. Valve seat bore 230 has an internal diameter $D_1$, and a diameter $D_1$ is illustrated in FIGS. 4A and 4B to denote the diameter of a corresponding circular area $A_1$ above plug 300. Since equal pressure acts on equal areas $A_1$ above and below plug 300, the forces resulting from pressure on these areas cancel out.

Also illustrated in these drawings are a diameter $D_2$ corresponding to the outmost extent of first annular seal 310, and a diameter $D_3$, corresponding to the outermost extent of the body of plug 300. An annular area $A_2$ is defined by the annulus lying between circles of diameter $D_1$ and $D_2$, and an annular area $A_3$ is defined by the annulus lying between circles of diameter $D_2$ and $D_3$. The fluid pressure in control chamber 250 acting on annular area $A_2$ serves to generate a net closing force on plug 300, forcing first annular seal 310 against corresponding first annular sealing region 110, thereby maintaining the valve closed and sealed. The fluid pressure of control chamber 250 acting on annular area $A_3$ acts on peripheral section 302 of plug 300, opposed only by the atmospheric pressure within the drainage channel, therefore tending to generate shear deformation in peripheral section 302 that forces second annular seal 350 into tight closure against second annular sealing region 120. The subdivision of the forces from the pressure on area $A_3$ between the body of the plug and shear effects in the peripheral section are dependent upon the elastic properties of the elastomer and the structure of the plug (such as the depth of annular recesses 330 and 306), as will be clear to a person ordinarily skilled in the art, and can be adjusted according to the desired properties. However, it is a particularly preferred feature of certain embodiments of the present invention that second annular seal 350 is to some extent "independent" of first annular seal 310 to the extent that it has sufficient mobility to allow closure of seal 350 before seal 310 makes contact with its seat, and for seal 350 to maintain its seal even if seal 310 is imperfect or is slightly opened. (To provide this mobility, any rigid core 308 of plug 300 is preferably limited to within diameter $D_2$.) The mobility associated with this independent function typically leads to a significant proportion of the force resulting from pressure on area $A_3$ being directed specifically to enhancing sealing of second annular seal 350.

Figure 5A:
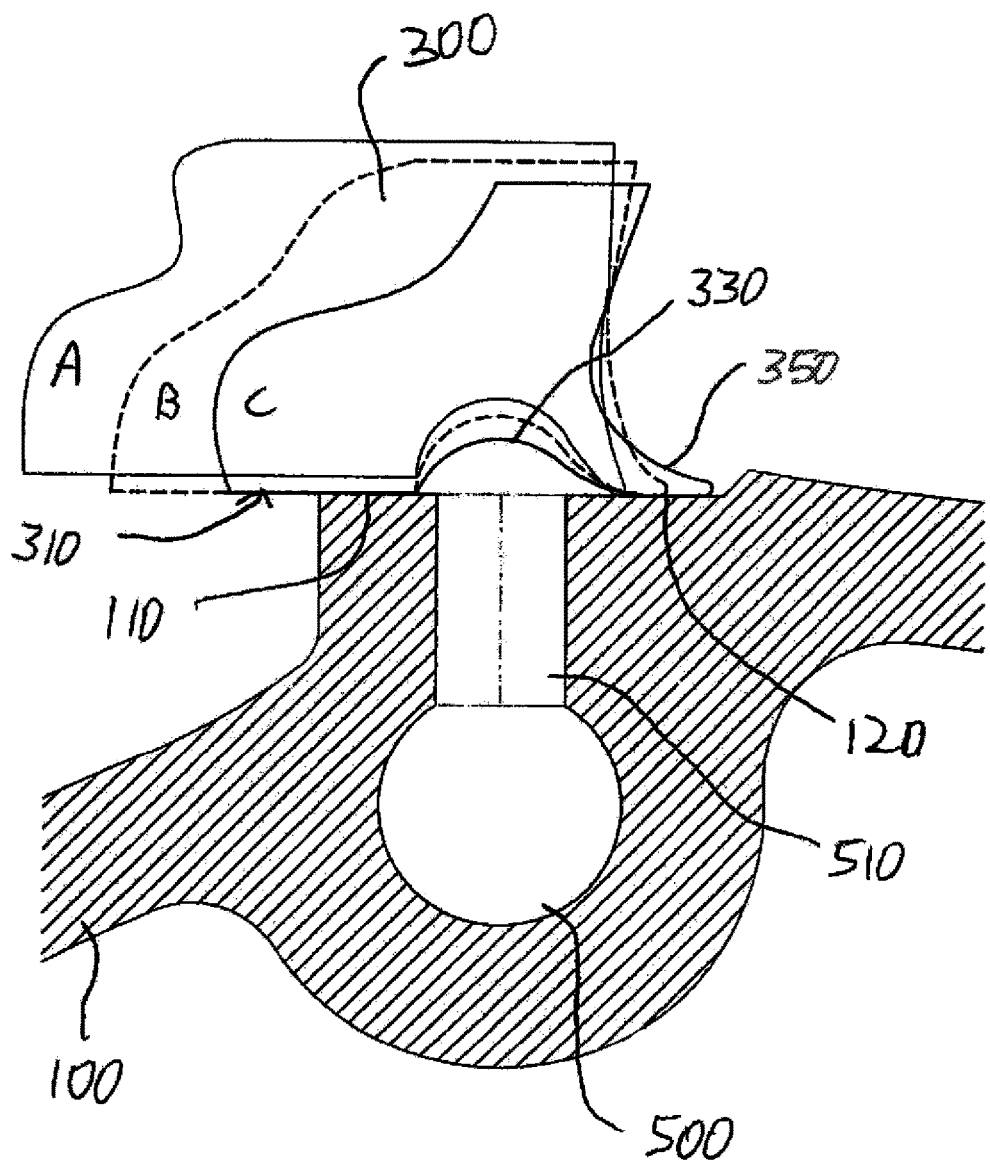
FIG. 5A is a further enlargement of a region of FIG. 4B showing sequential states of deformation of a region of a plug as it closes against the valve seat.

FIG. 5A shows schematically on a single drawing a sequence of positions and progressively-deformed shapes of plug 300 during the final stages of closing of the valve. The successive positions and shapes are illustrated schematically by partial outlines of plug 300 in three states labeled "A", "B" and "C". State "A" occurs momentarily at the point that downwardly-extending second annular seal 350 makes contact with second valve seat region 120, prior to contact of first annular seal 310 against first annular valve seat region 110. In this position, water flow to outlet 220 is already blocked. The pressure acting on the lower side of plug 300 is reduced by the drainage via openings 510 to the atmosphere, thereby ensuring continuing net force to close plug 300.

As motion of plug 300 continues, at position "B", first annular seal 310 contacts first annular sealing region 110, sealing flow from inlet 210 to drainage openings 510, so that the pressure within drainage openings 510 and around the corresponding annular leak-collection channel under recess 330 falls to atmospheric pressure, and the pressure differential acting downwards on peripheral section 302 is enhanced. This leads to further flattening of the lip of seal 350 so as to be pressed more firmly against valve seat 120, resulting in the state labeled "C". Additional sealing force is applied by pressure of compressed air present in the dry pipes connected to downstream port 220, thereby further enhancing the seal.

Figure 5B:
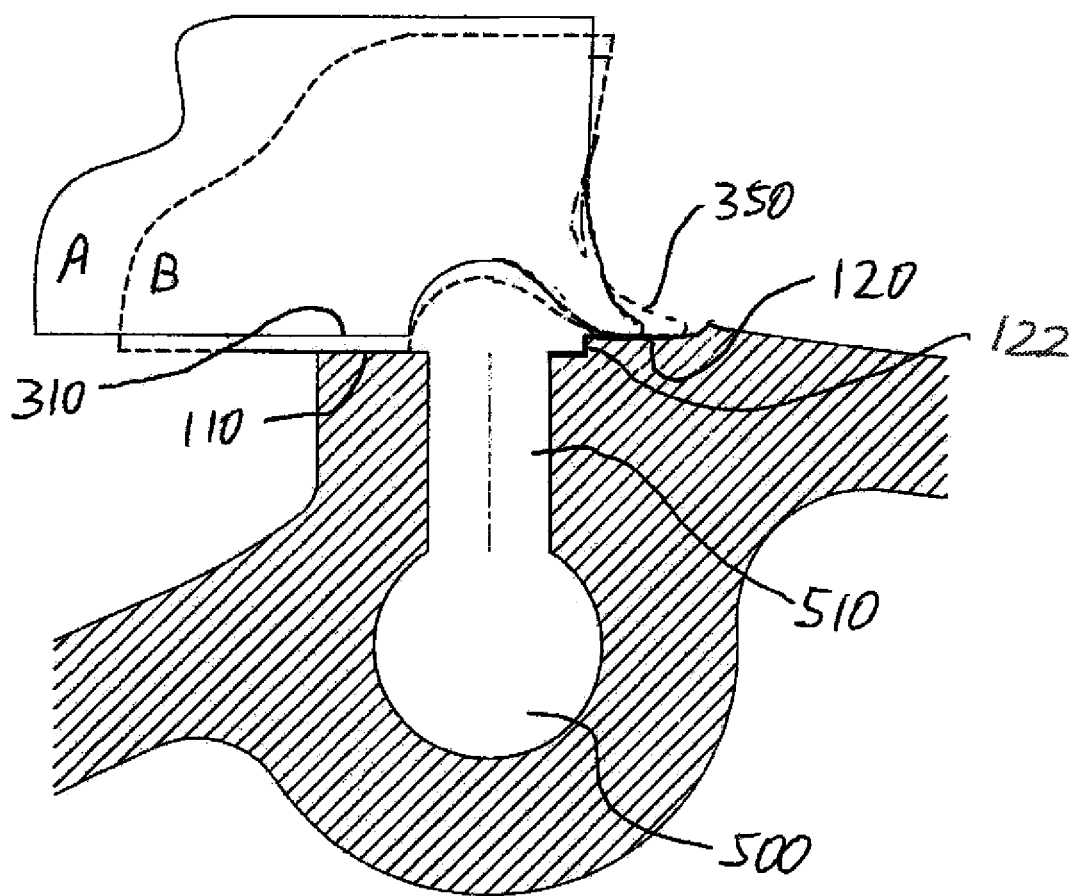
FIG. 5B is a cross-sectional view similar to FIG. 5A, showing a variant implementation of a double seal and valve seat.

In the preferred implementation illustrated thus far, first annular valve seat region 110 and second annular valve seat region 120 can advantageously be implemented as flat, coplanar surfaces, which may be different areas of a single contiguous flat valve seat interrupted by drainage openings 510. In this case, closure of seal 350 prior to closure of seal 310 is achieved by implementing seal 350 extending downwards from the level of the rest of plug 300. It should be noted however that a similar effect may be achieved by changing the valve seat geometry, where seal 350 is at the same level, or even higher, than seal 310. By way of one non-limiting example, FIG. 5B shows a view similar to FIG. 5A in which second annular valve seat region 120 is raised by providing a step 122 between regions 110 and 120. In this case, the desired sequence of contact of seal 350 preceding contact of seal 310 may be achieved using a lip of seal 350 which is on the same level as seal 310, but which makes contact with the corresponding raised valve seat contact surface 120 in position "A", prior to contact of first annular seal 310. The structure and function of the valve remains otherwise unchanged.

Turning now briefly to FIG. 6, in the closed state of the valve, there is preferably a continuous annular channel between first annular seal 310 and second annular seal 350 extending around the entire periphery of the valve seat, to allow any water reaching the atmospheric pressure zone between the seals to drain to drainage holes 510. In some cases, the channel may be provided solely by annular recess 330 of plug 300, closing against a continuous flat valve seat surface. Alternatively, as illustrated in FIGS. 6 and 7A, the channel may be formed at least in part by a slot 124 cut into the valve seat surface, subdividing between regions 110 and 120. Optionally, where slot 124 is provided, plug 300 may be implemented without an annular recess 330. Drainage openings 510 typically extend through valve body 100 from the base of slot 124 through to drainage conduit 500.

Turning now to FIG. 7B, although illustrated above as a series of isolated drainage openings 510, it will be noted that the drainage channel may equally be implemented in various other forms such as, for example, an elongated slot 512, typically arcuately shaped to follow the profile of the space between first and second sealing regions 110 and 120, which extends through body 100 to form a fluid connection with drainage conduit 500.

Figure 8:
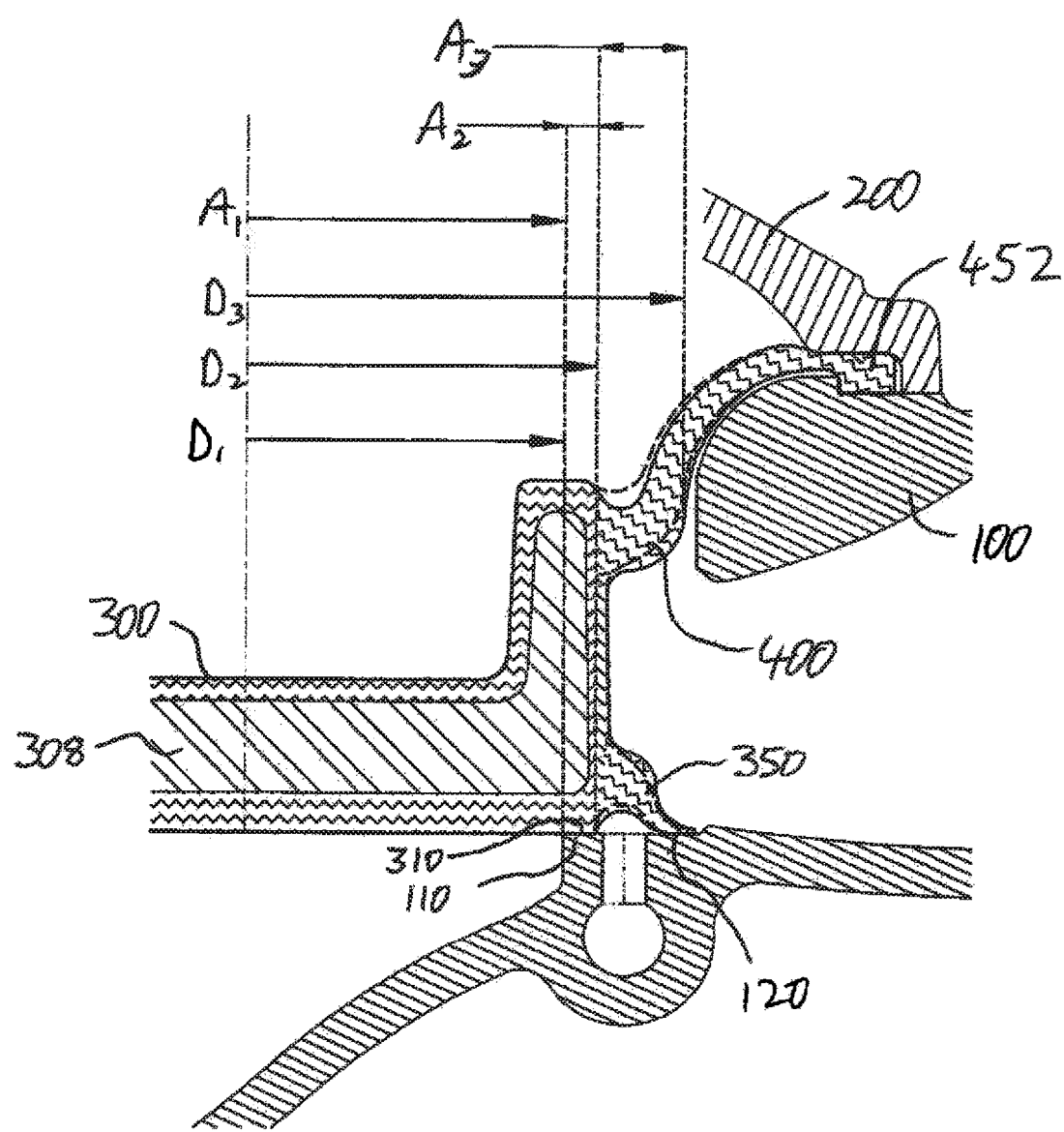
FIG. 8 is a cross-sectional view similar to FIG. 4B illustrating an alternative embodiment of the present invention.

In certain particularly preferred implementations as described above, the pressure difference between control chamber 250 and drainage conduit 500 contributes directly to the contact pressure of the second seal 350 on the second valve seat 120, particularly through compressive forces or shear deformation transmitted through outer peripheral section 302 of plug 300. It should be noted however that this feature is not essential. By way of example, FIG. 8 illustrates a variant embodiment in which the second seal 350 and the root of the diaphragm 400 are separately connected to the main plug 300 body, without a full bridge of interposed elastomer to convey compressive forces or shear deformation from control chamber 250 to the second seal 350. In this embodiment, sealing of the second seal 350 is achieved by the pre-formed elastic bias of the seal through which it contacts the valve seat 120, prior to first seal 310 touching valve seat 110. The pressure of compressed air found in the pipes connected to outlet 220 further presses the hp with a force corresponding to a pressure difference between the compressed air pressure in the outlet piping and the atmospheric pressure found in the drainage conduit 500.

It will be appreciated that the above descriptions are intended only to serve as examples, and that many other embodiments are possible within the scope of the present invention as defined in the appended claims.

What is claimed is:

1. A valve for sealing and selectively opening a flow path from a water-filled inlet to a dry outlet, the valve comprising:
   (a) a valve body having a valve opening surrounded by a first annular valve seat region, and having a second annular valve seat region surrounding said first annular valve seat region, said valve body including at least one drainage channel in fluid connection with a space between said first and second annular valve seat regions, said drainage channel providing a fluid drainage path to outside said valve body;
   (b) a plug displaceable between an open state and a closed state for closing said valve opening, said plug having a first annular seal deployed for sealing against said first annular valve seat region and a second annular seal deployed for sealing against said second annular valve seat region, said plug being integrated with a flexible diaphragm; and
   (c) a cover cooperating with said diaphragm to define a control chamber between said diaphragm and said cover, wherein said plug includes a peripheral section of elastomeric material forming a bridge between an upper peripheral portion of said plug and said second annular seal such that a pressure difference between said control chamber and said drainage channel effects a shear deformation of said peripheral section, thereby varying a closing force of said second annular seal against said second annular valve seat region, and wherein said second annular seal and said peripheral section of said plug are configured such that, during displacement of said plug from said open state towards said closed state, said second annular seal closes against said second annular valve seat region prior to contact between said first annular seal and said first annular valve seat region, said second annular seal being elastically deformed so as to be pressed into contact with said second annular valve seat region when said plug reaches said closed state.

2. The valve of claim 1, wherein said second annular seal has an outward flaring lip deployed such that a pressure differential between an outlet pressure at the outlet and a drain pressure in said drainage channel acts to enhance a seal for said second annular seal against said second annular valve seat region.

3. The valve of claim 1, wherein said plug, said diaphragm, said valve body and said cover are configured such that, when a pressure in said control chamber equals a pressure at the inlet, a net closing force acts to close said first annular seal against said first annular valve seat region.

4. The valve of claim 1, wherein said peripheral section of elastomeric material of said plug is defined in part by an annular recess formed in an upper surface of said plug.

5. The valve of claim 1, wherein said plug further comprises a rigid core deployed to render rigid a portion of said plug inwards from said peripheral section of elastomeric material.

* * * * *